United States Patent
Ogilvie et al.

(10) Patent No.: US 7,275,124 B2
(45) Date of Patent: Sep. 25, 2007

(54) METHOD AND SYSTEM FOR CONTROLLING FORWARDING OR TERMINATING OF A REQUEST AT A BUS INTERFACE BASED ON BUFFER AVAILABILITY

(75) Inventors: Clarence R. Ogilvie, Huntington, VT (US); Charles S. Woodruff, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 11/064,570

(22) Filed: Feb. 24, 2005

(65) Prior Publication Data
US 2006/0190661 A1    Aug. 24, 2006

(51) Int. Cl.
*G06F 13/36* (2006.01)
*G06F 12/00* (2006.01)
*G01R 31/08* (2006.01)

(52) U.S. Cl. ............... 710/310; 710/311; 710/312; 710/305; 710/306; 711/146; 370/230

(58) Field of Classification Search ........ 710/306–315, 710/305; 711/146; 370/230
See application file for complete search history.

(56) References Cited

U.S. PATENT DOCUMENTS

| | | | |
|---|---|---|---|
| 4,281,381 A | 7/1981 | Ahuja et al. | |
| 5,038,346 A | 8/1991 | Courtois | |
| 5,546,546 A | 8/1996 | Bell et al. | |
| 5,581,705 A | 12/1996 | Passint et al. | |
| 5,740,409 A | 4/1998 | Deering | |
| 5,778,096 A | 7/1998 | Stearns | |
| 5,835,739 A | 11/1998 | Bell et al. | |
| 5,835,741 A | 11/1998 | Elkhoury et al. | |
| 5,841,973 A | 11/1998 | Kessler et al. | |
| 5,893,151 A | 4/1999 | Merchant | |
| 6,021,451 A | 2/2000 | Bell et al. | |
| 6,055,608 A * | 4/2000 | Arimilli et al. | 711/146 |
| 6,065,087 A | 5/2000 | Keaveny et al. | |
| 6,124,868 A | 9/2000 | Asaro et al. | |

(Continued)

OTHER PUBLICATIONS

John L. Hennessy et al., *Computer Architecture: A Quantitative Approach*, Second Edition, Chapter 8: Multiprocessors, Morgan Kaufmann Publishing, pp. 638-639 and 680 (1996).

*Primary Examiner*—Paul R. Myers
*Assistant Examiner*—Brian Misiura
(74) *Attorney, Agent, or Firm*—Heslin Rothenberg Farley & Mesiti, PC

(57) ABSTRACT

A bus bridge for coupling between a first bus and a second bus includes: a number of data buffers for a particular request type; a counter for monitoring a number of requests of the particular type received at the bus bridge from the first bus for access to the second bus; and override logic. Each request of the particular type requires one data buffer of the number of data buffers for the particular request type. The override logic determines when the monitored number of requests of the particular type exceeds the number of data buffers for the particular request type at the bus bridge, and responsive thereto, initiates a request termination signal at the bus bridge to terminate a received request of the particular type. When request coherency is maintained employing snooping, the request termination signal is a retry snoop response signal output from the bus bridge.

17 Claims, 7 Drawing Sheets

U.S. PATENT DOCUMENTS

| | | | |
|---|---|---|---|
| 6,138,218 A * | 10/2000 | Arimilli et al. | 711/146 |
| 6,247,086 B1 | 6/2001 | Allingham | |
| 6,252,849 B1 * | 6/2001 | Rom et al. | 370/230 |
| 6,363,438 B1 | 3/2002 | Williams et al. | |
| 6,405,276 B1 | 6/2002 | Chen et al. | |
| 6,449,699 B2 | 9/2002 | Franke et al. | |
| 6,477,610 B1 * | 11/2002 | Willenborg | 710/310 |
| 6,502,154 B1 * | 12/2002 | Meredith et al. | 710/305 |
| 6,502,157 B1 * | 12/2002 | Batchelor et al. | 710/310 |
| 6,556,952 B1 | 4/2003 | Magro | |
| 6,571,308 B1 | 5/2003 | Reiss et al. | |
| 6,581,116 B1 | 6/2003 | Arimilli et al. | |
| 6,668,309 B2 | 12/2003 | Bachand et al. | |
| 6,694,383 B2 | 2/2004 | Nguyen et al. | |
| 6,725,296 B2 | 4/2004 | Craddock et al. | |
| 6,751,695 B1 * | 6/2004 | Jirgal | 710/305 |
| 6,799,317 B1 | 9/2004 | Heywood et al. | |
| 6,801,207 B1 | 10/2004 | Tischler et al. | |
| 6,801,208 B2 | 10/2004 | Keshava et al. | |
| 6,810,467 B1 * | 10/2004 | Khare et al. | 711/146 |
| 6,816,161 B2 | 11/2004 | Lavelle et al. | |
| 6,820,143 B2 | 11/2004 | Day et al. | |
| 6,820,174 B2 | 11/2004 | Vanderwiel | |
| 6,848,032 B2 * | 1/2005 | Benkual et al. | 711/146 |
| 6,886,048 B2 * | 4/2005 | Richard et al. | 710/5 |
| 6,889,284 B1 | 5/2005 | Nizar et al. | |
| 6,959,364 B2 * | 10/2005 | Safranek et al. | 711/146 |
| 6,978,319 B1 | 12/2005 | Rostoker et al. | |
| 6,985,988 B1 | 1/2006 | Nsame | |
| 6,993,632 B2 | 1/2006 | Kruckemyer et al. | |
| 7,054,987 B1 * | 5/2006 | Reed et al. | 710/310 |
| 7,124,232 B2 * | 10/2006 | Takeda et al. | 710/310 |
| 7,143,246 B2 * | 11/2006 | Johns | 711/146 |
| 2004/0117592 A1 | 6/2004 | Day et al. | |
| 2004/0156199 A1 | 8/2004 | Rivas et al. | |
| 2004/0162946 A1 | 8/2004 | Day et al. | |
| 2004/0168011 A1 | 8/2004 | Hemming | |
| 2004/0263519 A1 | 12/2004 | Andrews et al. | |
| 2006/0069788 A1 | 3/2006 | Blackmore et al. | |
| 2006/0190651 A1 * | 8/2006 | Ogilvie et al. | 710/220 |
| 2006/0190655 A1 * | 8/2006 | Kautzman et al. | 710/306 |
| 2006/0190659 A1 * | 8/2006 | Biran et al. | 710/310 |
| 2006/0190660 A1 * | 8/2006 | Horton et al. | 710/310 |
| 2006/0190661 A1 | 8/2006 | Ogilvie et al. | |
| 2006/0190662 A1 * | 8/2006 | Orilvie et al. | 710/310 |
| 2006/0190667 A1 * | 8/2006 | Drehmel et al. | 710/315 |
| 2006/0190668 A1 * | 8/2006 | Biran et al. | 710/315 |

* cited by examiner

METHOD AND SYSTEM FOR CONTROLLING FORWARDING OR TERMINATING OF A REQUEST AT A BUS INTERFACE BASED ON BUFFER AVAILABILITY

CROSS REFERENCE TO RELATED APPLICATIONS

This application contains subject matter which is related to the subject matter of the following applications, each of which is assigned to the same assignee as this application and each of which is hereby incorporated herein by reference in its entirety:

"Method and System For Ordering Requests at a Bus Interface", Ogilvie et al., Ser. No. 11/064,728, filed Feb. 24. 2005;

"Data Ordering Translation Between Linear and Interleaved Domains at a Bus Interface", Horton et al., Ser. No. 11/064,569, filed Feb. 24. 2005;

"Computer System Bus Bridge", Biran et al., Ser. No. 11/064,568, filed Feb. 24. 2005;

"Apparatus and Method for Transaction Tag Mapping Between Bus Domains", Kautzman et al., Ser. No. 11/064,567, filed Feb. 24. 2005;

"Transaction Flow Control Mechanism for a Bus Bridge", Ogilvie et al., Ser. No. 11/064,722, filed Feb. 24. 2005;

"Pipeline Bit Handling Circuit and Method for a Bus Bridge", Drehmel et al., Ser. No. 11/064,744, filed Feb. 24. 2005; and "Computer System Architecture", Biran et al., Ser. No. 11/064,745, filed Feb. 24. 2005.

TECHNICAL FIELD

The present invention relates in general to the field of data transfer in a computer system, and more particularly, to methods and systems for monitoring buffer availability for handling a particular request type at a bus interface, and based thereon, for controlling forwarding or initiating termination of a received request of the particular type at the bus interface.

BACKGROUND OF THE INVENTION

Computer systems generally include multiple agents, such as microprocessors, storage devices, display devices, etc., which are interconnected via a system bus. The system bus operates to transfer address, data and control signals between these agents. Certain computer systems employ multiple busses, in which various agents are coupled to one or more busses. Typically, each agent is coupled to a single bus.

Bus bridges are often utilized in multiple-bus systems to connect the busses and thereby allow agents coupled to one type of bus to access agents coupled to another type of bus. The function of the bus bridge typically involves transferring commands between two busses. The commands transferred by the bus bridge often have data associated with them (e.g., read or write commands) which require buffering.

An error can occur at a bus bridge if too many requests are received for the available buffers at the bus bridge. This might arise because the bus bridge conventionally lacks authority to hold off requests from being sent to the bridge. If an agent sends a request to a bus bridge, then the bus bridge must conventionally have resources available to receive the data associated with the request, otherwise an error occurs. Although various bus bridge implementations exist in the art, it is believed advantageous to provide a method and system which resolve the buffer availability problem in a more effective and efficient manner than previously known. The present invention provides such a solution.

SUMMARY OF THE INVENTION

The shortcomings of the prior art are overcome and additional advantages are provided through a method which includes: monitoring at a bus interface a number of requests of a particular type for access to a resource, each request of the particular type requiring one data buffer of a number of data buffers for the particular request type at the bus interface; and responsive to a received request of the particular type, initiating a request termination signal at the bus interface to terminate the received request when the monitored number of the requests of the particular type exceeds the number of data buffers for the particular request type at the bus interface.

In another aspect, a system is provided which includes: means for monitoring at a bus interface a number of requests of a particular type for access to a resource, each request of the particular type requiring one data buffer of a number of data buffers for the particular request type at the bus interface; and means for initiating a request termination signal at the bus interface to terminate a received request of the particular type when the monitored number of requests of the particular type exceeds the number of data buffers for the particular request type at the bus interface.

In a further aspect, a system is provided which includes a bus bridge for coupling between a first bus and a second bus. The bus bridge includes a number of data buffers for a particular request type, a counter for monitoring the number of requests of the particular type received at the bus bridge, and override logic. Each request of the particular type requires one data buffer of the number of data buffers for the particular request type. The override logic determines when the monitored number of requests of the particular type exceeds the number of data buffers for the particular request type at the bus bridge, and responsive thereto, initiates a request termination signal at the bus bridge to terminate a received request of the particular type.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

As used herein, a "request" includes any transaction, reflected transaction, command, reflected command, or other type of request, response or event, etc., associated with transferring data.

Figure 1:
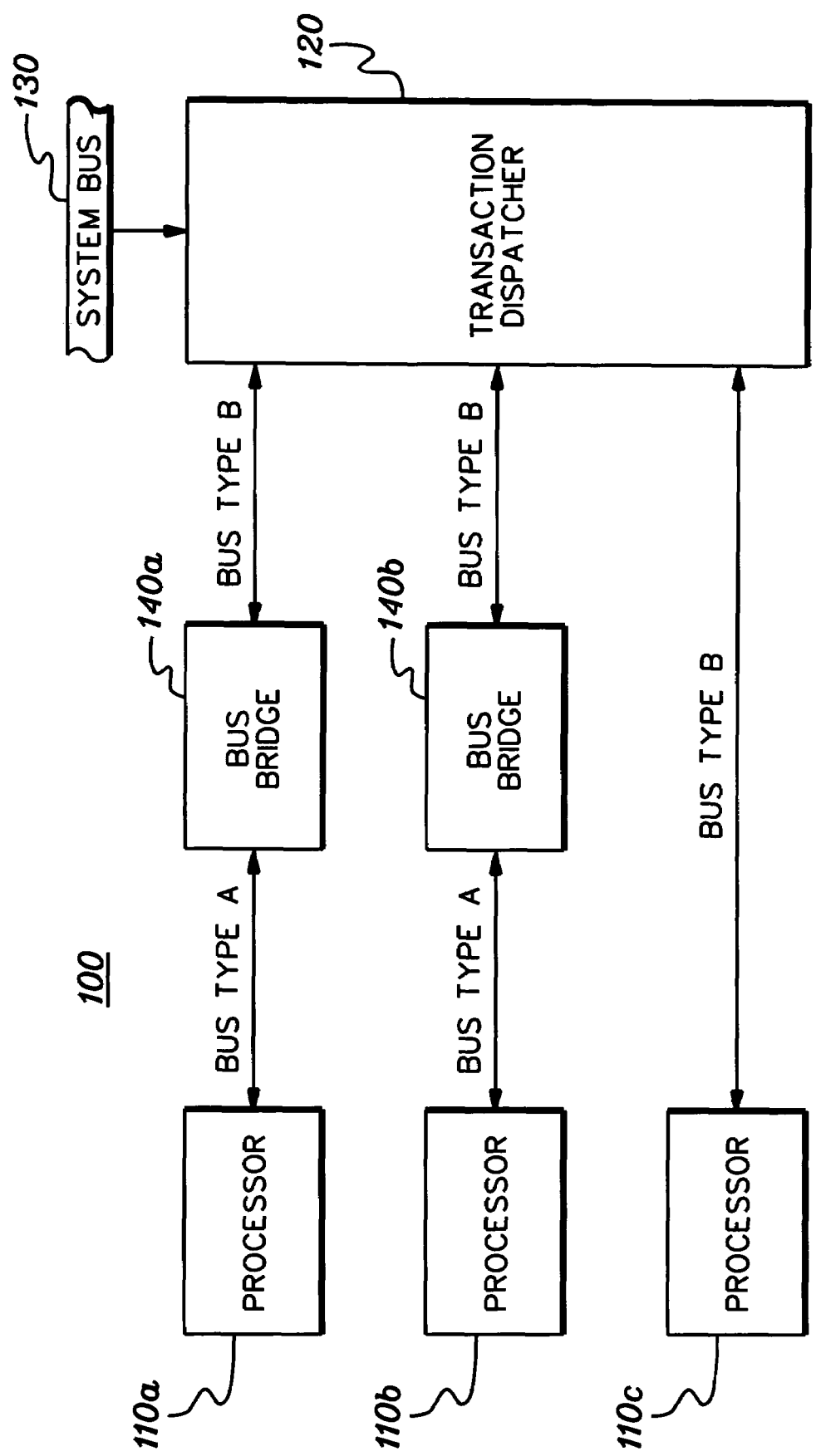
FIG. 1 depicts a partial block diagram representation of a computer system employing bus bridges between different bus types, which may employ one or more aspects of the present invention.

FIG. 1 depicts one embodiment of a computer system, generally denoted 100, to employ one or more aspects of the present invention. In system 100, multiple processors 110a, 110b, 110c are coupled to a system bus 130 via a transaction dispatcher 120. In this example, transaction dispatcher 120 comprises arbitration logic which decides which request to perform next, and may include a dispatch unit or address concentrator. Transaction dispatcher 120 communicates with processors 110a, 110b and 110c via respective busses of bus type B. In this multi-processor environment, processors 110a & 110b are assumed to communicate using busses of bus type A, and thus, bus bridges 140a & 140b are employed to convert requests between bus type A and bus type B, both of which are assumed to comprise coherent busses. Thus, processor 110a and processor 110b communicate with transaction dispatcher 120 via their respective bus bridges 140a, 140b. By way of example, bridges 140a, 140b are assumed to maintain coherency via snooping. One example of computer system 100, wherein cache coherency is maintained via snooping, is a PowerPC 750 System offered by International Business Machines Corporation of Armonk, N.Y.

Those skilled in the art will note that the bus interface disclosed herein can be employed to convert requests between any two types of busses. In one aspect, the present invention solves the problem of bridge buffer unavailability in a computer system 100 wherein bus bridges are employed to translate requests from one type of processor bus (bus type A) to another type of processor bus (bus type B).

Figure 2:
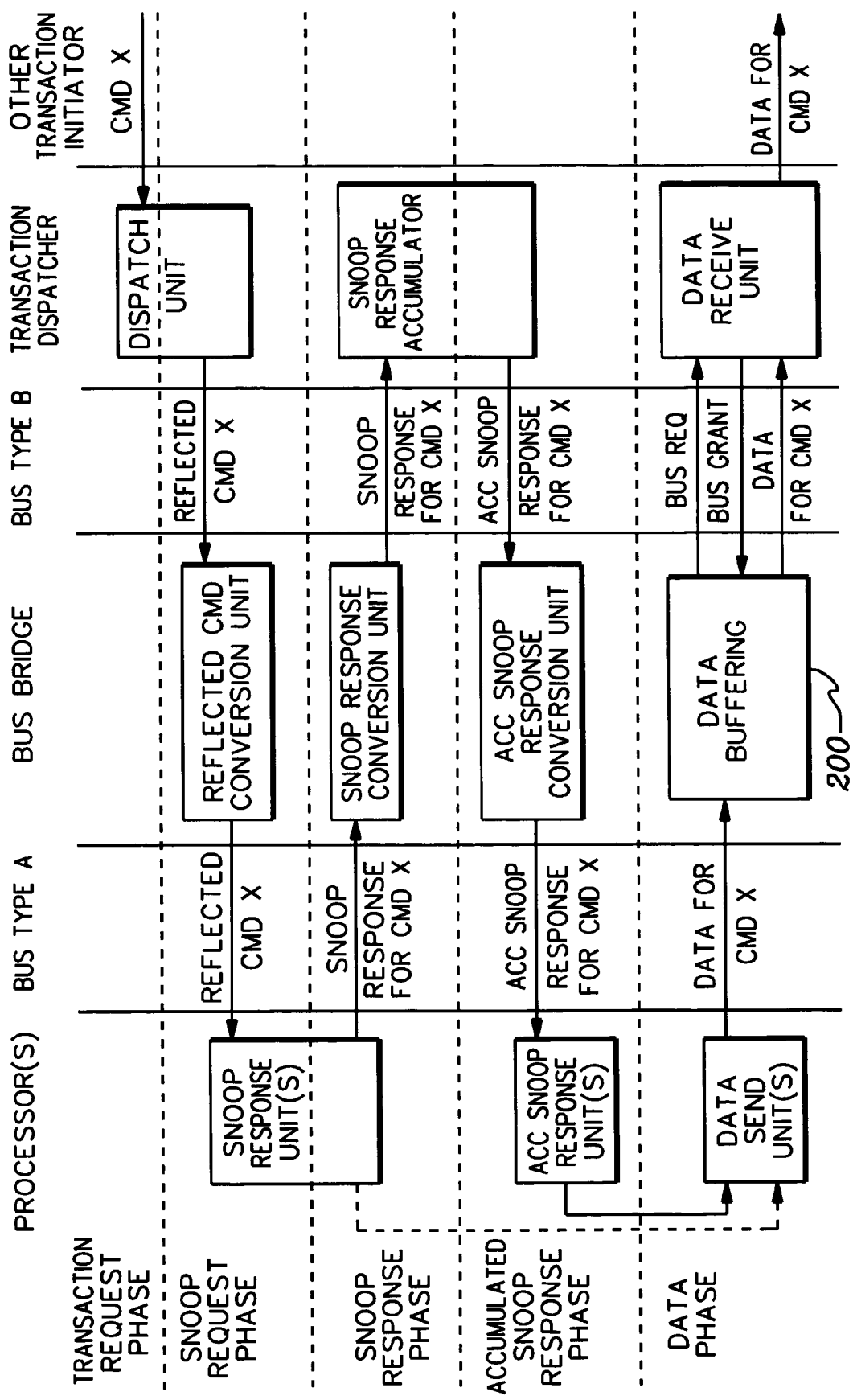
FIG. 2 depicts one example of a generic request handling protocol between bus type A and bus type B employing a coherent bus bridge, in accordance with an aspect of the present invention.

FIG. 2 depicts one example of a general request processing sequence (in accordance with an aspect of the present invention) between bus type A and bus type B in a computing environment maintaining cache coherency via snooping. During a transaction request phase, a transaction is initiated by a master, and the transaction initiator issues a command (CMD) X. This command is received at the transaction dispatcher where it is reflected back towards the processor memory outlets (i.e., caches) in a system that requires coherency. This reflected command X is issued during a snoop request phase of the transaction processing. The bus bridge converts this reflected command and forwards the converted command to the respective snoop response unit(s) of the processor(s) coupled thereto via bus type A. Responsive to receipt of the reflected command, a snoop response phase is entered where the processor issues a snoop response for command X. The snoop response(s) is issued according to each processor's cache contents. This snoop response is converted from bus type A to bus type B via a snoop response conversion unit 200 within the bus bridge and is sent to a snoop response accumulator within the transaction dispatcher.

The transaction dispatcher then generates an accumulated snoop response (Acc Snoop Response) and puts this accumulated response onto bus type B. The bus bridge converts the accumulated snoop response in an accumulated snoop response conversion unit and sends it to an accumulated snoop response unit(s) of the respective processor(s) via bus type A. The snoop response conversion happens in a similar manner as conversion of commands that were initiated by the master. Responsive to receipt of the accumulated snoop response, one processor sends data during a data phase (if necessary) depending on command X and the accumulated snoop response. This data is forwarded across bus type A to dedicated buffers of the particular request type in the bus bridge. The bus bridge accepts the data from the processor and puts the data into one buffer of the number of buffers of the particular request type. This data buffer then requests access to bus type B, and once granted, forwards the data for command X to a data receive unit in the transaction dispatcher, after which the data is forwarded to the master initiating the request for data. Note that multiple overlapping requests of a particular type can be processed by the bus bridge provided that a buffer of the number of dedicated buffers of the particular request type is available for accommodating data during a data phase of each request.

As noted above, a problem addressed by the present invention is that the bus bridge conventionally lacks logic to delay one or more processors from sending data responsive to a request of a particular type in the case where a buffer of the particular type is unavailable at the bridge. Because, in one implementation, there are a fixed number of buffers of a particular type for handling overlapping requests of the particular type, an error can result if a buffer is unavailable when data is sent. This scenario could arise if the transaction dispatcher is forwarding requests at a greater rate than can be handled by the bus bridge. For example, the address concentrator within the transaction dispatcher may issue a burst of reflected read commands. The present invention is directed to a technique for handling this situation and is discussed below by way of example as a read intervention data flow control method and system. In this example, it is assumed that each modified intervention snoop response requires one buffer of a number of modified intervention read buffers existing at the bus bridge. Also, note that although described herein below with reference to a read command with modified intervention, the concepts presented are applicable to other types of requests accommodated by the bus bridge, for example, write transactions, read transactions, flush transactions, etc.

Figure 3:
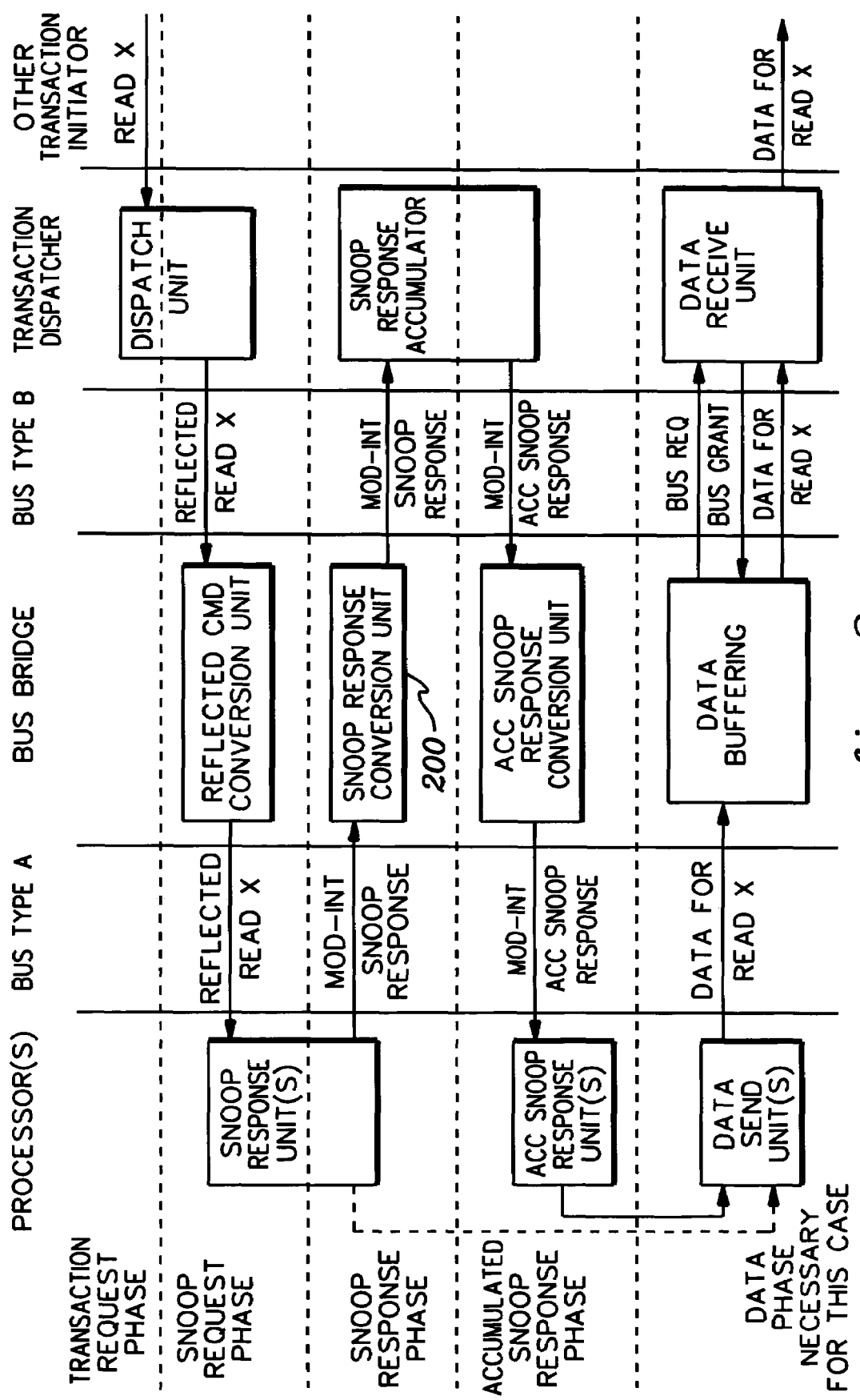
FIG. 3 depicts one example of a read request protocol with modified intervention between bus type A and bus type B employing a coherent bus bridge and assuming buffer availability, in accordance with an aspect of the present invention.

FIG. 3 depicts one example of a read command protocol with modified intervention by a processor, and with a corresponding read intervention buffer available at the bus bridge. During a transaction request phase, a read transaction is initiated from another master device (e.g., coupled to the system bus in FIG. 1), and is reflected through the transaction dispatcher via a dispatch unit (e.g., an address concentrator) across bus type B to the bus bridge. The bus bridge converts this reflected read command in a reflected command conversion unit and forwards the converted command to the respective snoop response unit(s) of the processor(s) coupled to bus type A. Upon receipt of the reflected command, a processor is assumed to issue, in this example, a modified intervention (MOD-INT) snoop response. This modified intervention snoop response indicates that the processor has a line of memory modified in its cache that the processor wishes to provide to the requesting master in response to the read command. The modified intervention snoop response is converted in the snoop response conversion logic 200 for output on bus type B to a snoop response accumulator within the transaction dispatcher. A global snoop reply (i.e., an accumulated snoop response) is subsequently returned by the transaction dispatcher across bus type B to the bus bridge where it is converted for output across bus type A to the processor(s). If the transaction dispatcher returns a modified intervention signal after accumulating all snoop responses, then the processor will send its corresponding data to the bridge during a data phase. This data requires one buffer of a fixed number of buffers at the bus bridge for buffering modified intervention read data. The example of FIG. 3 assumes buffer availability at the bus bridge. The data is buffered at the bridge until the transaction dispatcher grants access to bus type B, after which the data is forwarded to a data receive unit within the transaction dispatcher, and thereafter to the master initiating the read transaction.

Figure 4:
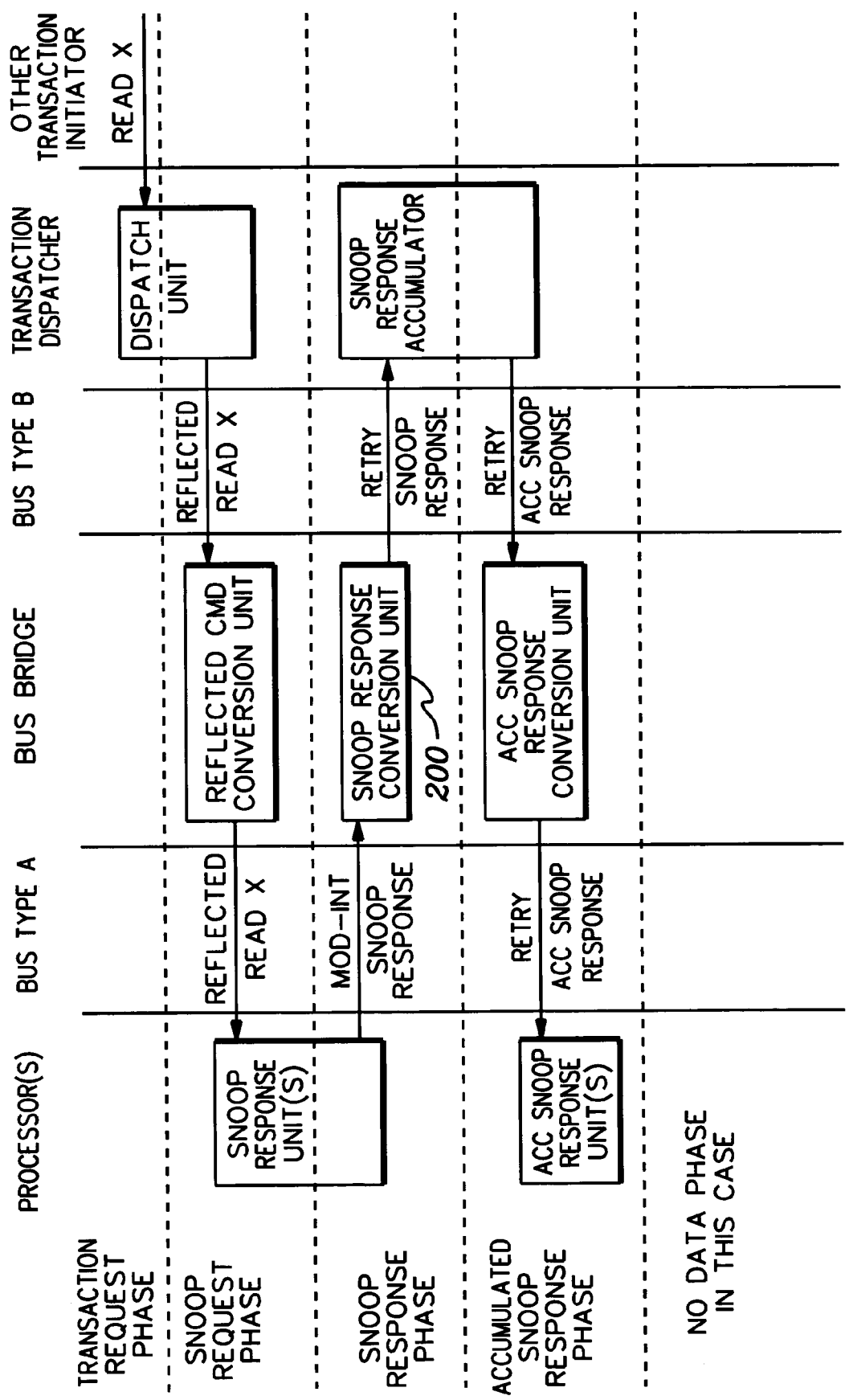
FIG. 4 depicts one example of a read request protocol with modified intervention between bus type A and bus type B employing a coherent bus bridge and assuming buffer unavailability, in accordance with an aspect of the present invention.

FIG. 4 depicts one example of a read command protocol with modified intervention by a processor, wherein (in accordance with an aspect of the present invention) a read intervention buffer is currently unavailable in the bus bridge. The protocol is initiated by a master device with a read command X issued during a transaction request phase. This command is reflected through the dispatch unit of the transaction dispatcher to bus type B and hence to the reflected command conversion unit within the bus bridge during a snoop request phase. The reflected command conversion unit converts the reflected command for output across bus type A to the snoop response unit of one or more processors. One processor receiving the reflected read command is assumed to reply with a modified intervention (MOD-INT) snoop response, which indicates that the processor has a line of memory modified in its cache that the processor would like to provide to the requesting master responsive to the read command. The modified intervention snoop response is forwarded to the snoop response conversion unit 200 within the bus bridge, which in accordance with the present invention, overrides the processor's reply with a request termination signal, which in one example, comprises a retry snoop response. This request termination signal is issued in this case by the snoop response conversion unit because the bus bridge is assumed to lack an available read modify intervention buffer at the current time to handle all of the outstanding read modify intervention transactions plus this new one. The retry snoop response will force the original read command to be reissued by the initiating master, thus giving the bus bridge time to empty a buffer of the required type. The retry snoop response is accumulated by the transaction dispatcher in the snoop response accumulator and a retry accumulated snoop response signal is sent to the master initiating the request, and is returned back across bus type B to the bus bridge where it is converted by the accumulated snoop response conversion unit for output across bus type A to the processor issuing the modified intervention snoop response. The retry accumulated snoop response is received by the processor at an accumulated snoop response unit, and informs the processor that the read modify intervention transaction has been aborted. The aborted read transaction will likely be retried at a later time by the initiating master.

Figure 5:
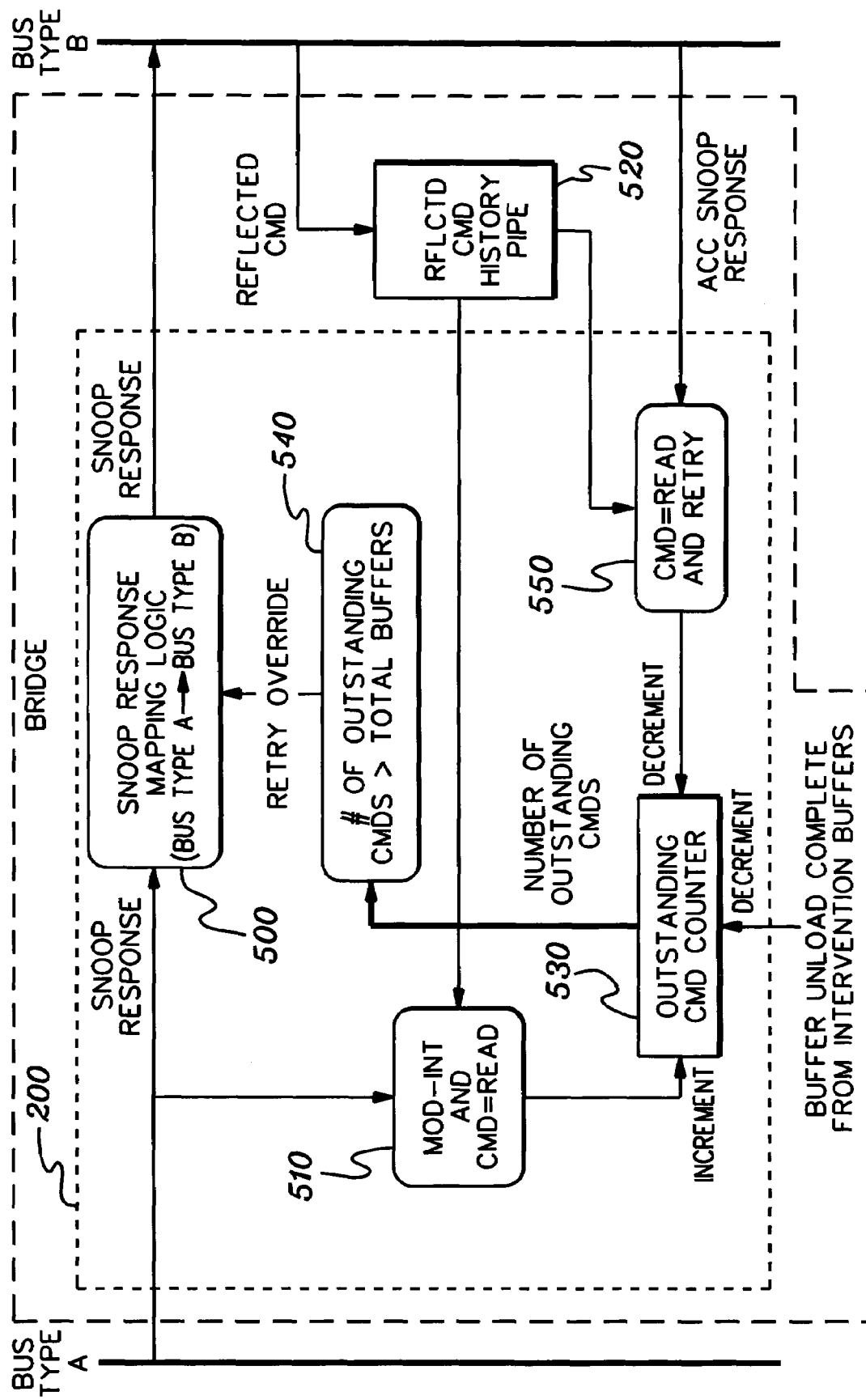
FIG. 5 is a block diagram of one embodiment of a snoop response conversion unit, in accordance with an aspect of the present invention.

FIG. 5 depicts one embodiment of a snoop response conversion unit 200 in accordance with the present invention. Snoop response conversion unit 200 receives a snoop response, which in one example may comprise a modified intervention snoop response, into snoop response mapping logic 500. Logic 500 maps the snoop response from bus type A format to bus type B format in a conventional manner; that is, unless a retry override is issued as explained below. If not overridden, the converted snoop response is forwarded from snoop response mapping logic 500 to bus type B.

The snoop response received at the conversion unit 200 is also forwarded to logic 510 which confirms that the snoop response is a modified intervention snoop response and that the initiating command was a read command. The type of initiating command is obtained from a reflected command history pipe 520 maintained by the bus bridge. If both conditions are true, then an outstanding command counter 530 is incremented. Counter 530 tracks the number of outstanding read commands with modified intervention snoop responses at the bus bridge. The value of counter 530 is monitored by override logic 540 which compares the number of outstanding read commands with modified intervention with the total number of modified intervention read buffers existing at the bus bridge. If the number of outstanding read commands with modified intervention exceeds the number of modified intervention read buffers available at the bus bridge, then a request termination signal or retry override is output from override logic 540 to the snoop response mapping logic 500. If the retry override signal is issued, then rather than mapping the modified intervention snoop response from bus type A to bus type B, the snoop response mapping logic 500 outputs a retry snoop response signal on bus type B to the transaction dispatcher. In this way, any new read with modified intervention which could possibly overflow the corresponding buffers is aborted before reaching the data phase. The outstanding command counter decrements when an outstanding read transaction with modified intervention completes its data phase (as indicated by the buffer unload complete from intervention buffers signal) or when a read command is aborted for some reason (as indicated by decrement logic 550 receiving an accumulated snoop response which is a retry accumulated snoop response and the command which initiated the response being a read command). Those skilled in the art will note, that in accordance with the snoop response conversion logic embodiment of FIG. 5, a decision to override a modified intervention snoop response is made without direct monitoring of individual modified intervention read buffers at the bus bridge.

Figure 6:
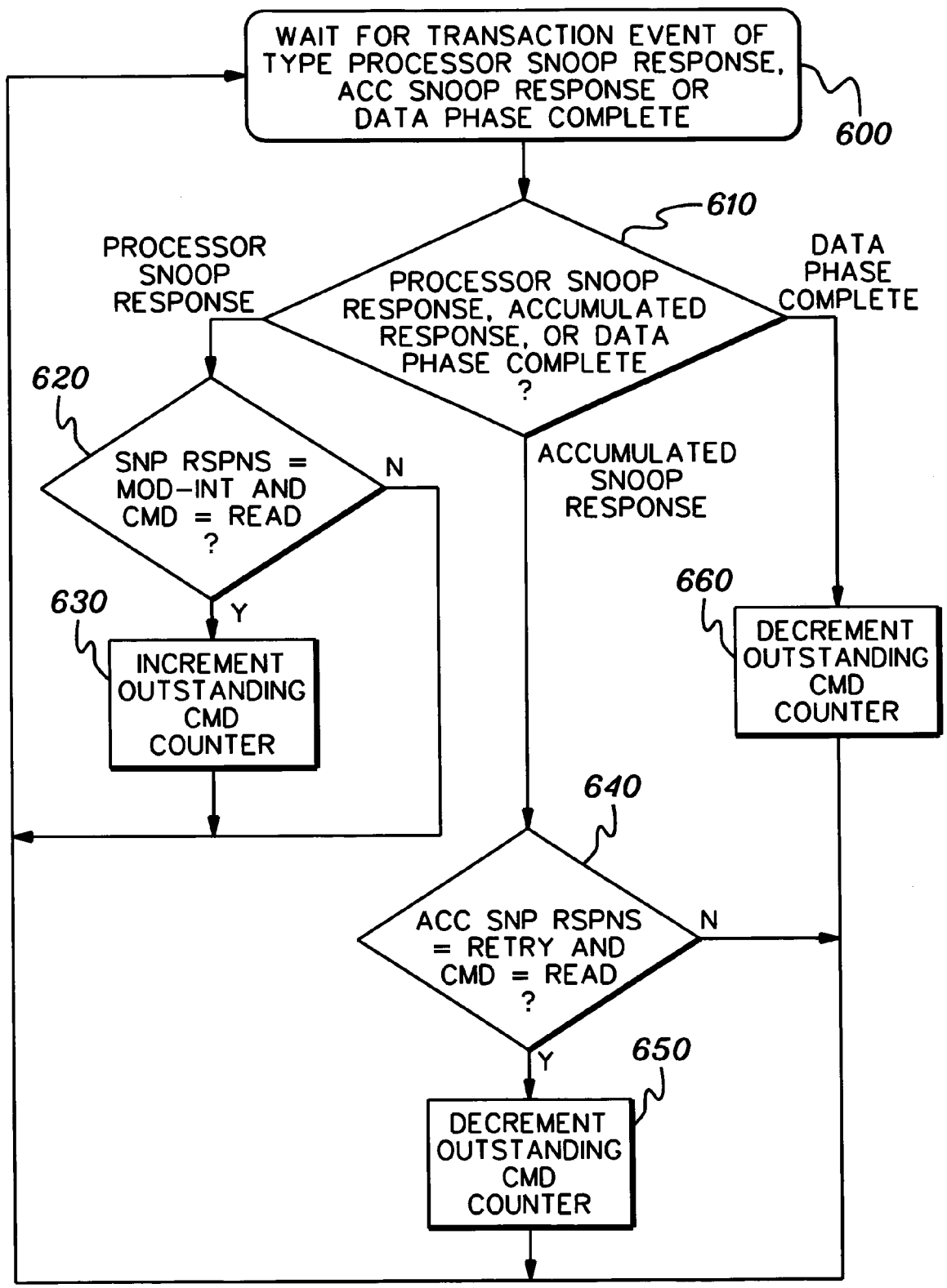
FIG. 6 is a flowchart of one embodiment of flow control logic for the outstanding command counter of FIG. 5, in accordance with an aspect of the present invention.

FIG. 6 is a flowchart of one embodiment of the outstanding command counter 530 control logic for incrementing and decrementing the counter value. The flowchart is a continuous loop wherein the logic waits for a transaction event of a type that is a processor snoop response, an accumulated snoop response or a data phase complete signal 600. Upon receipt of one of these events, the logic determines whether the event is a processor snoop response, an accumulated snoop response or a data phase complete signal 610 and branches accordingly. If a processor snoop response has been received, then the logic determines whether the snoop response is a modified intervention snoop response, with the originating command being a read command 620. If "yes", then the logic increments the outstanding command counter 630 before returning to wait for the next transaction event 600. Otherwise, the control flow directly returns from inquiry 620 to wait for a next transaction event 600.

If the received transaction event is an accumulated snoop response signal, then from inquiry 610 the logic determines whether the accumulated snoop response signal is a retry accumulated snoop response, with the originating command being a read command 640. If "yes", then the outstanding command counter is decremented 650, before the control flow returns to wait for a next transaction event 600. If the accumulated snoop response is other than a retry signal or the originating command is other than a read signal, then the flow control simply returns from inquiry 640 to wait for the next transaction event 600. Assuming that the received transaction event is a data phase complete signal, then from inquiry 610 the flow control decrements the outstanding command counter 660, before returning to wait for a next transaction event 600.

Figure 7:
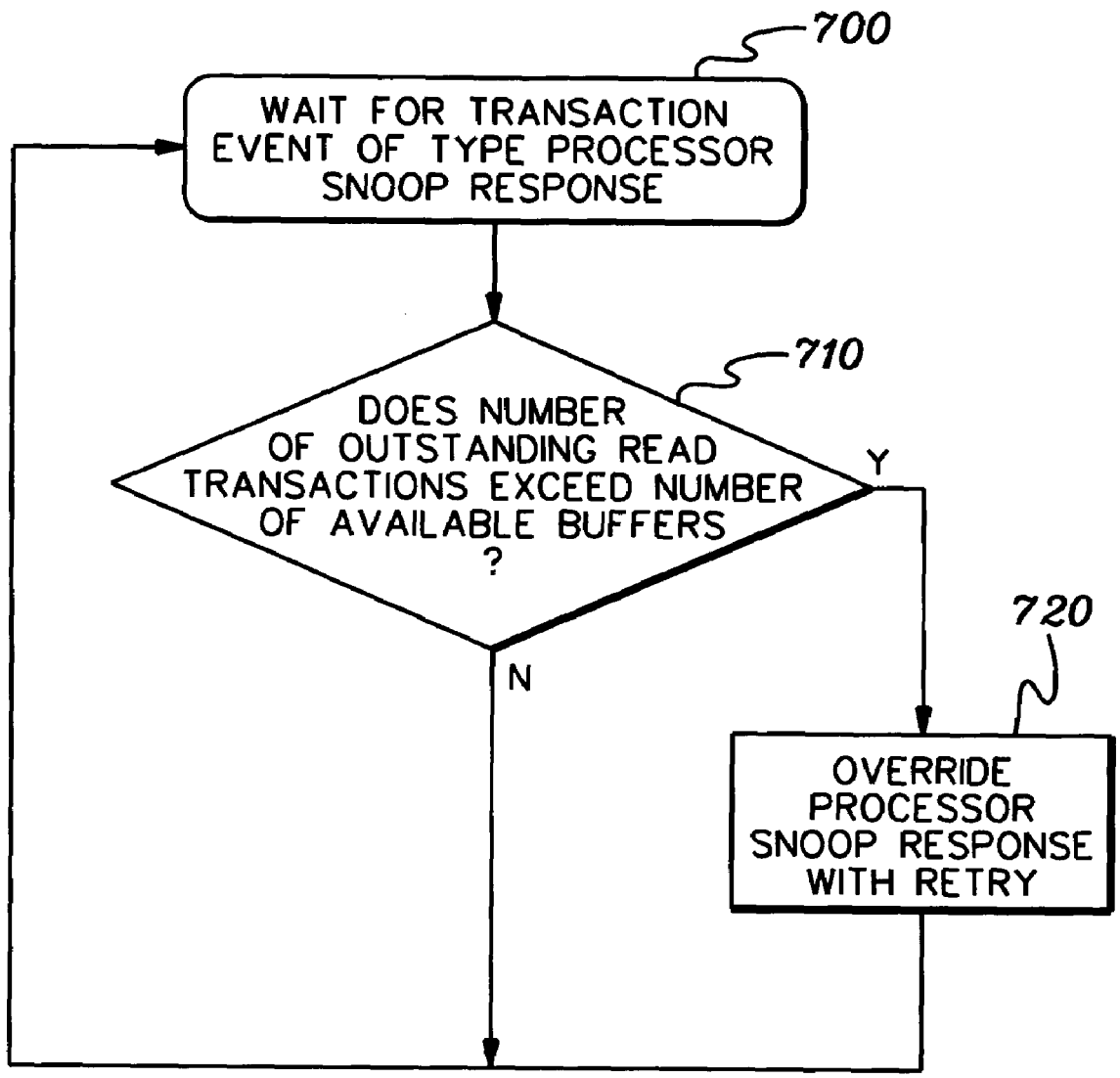
FIG. 7 is a flowchart of one embodiment of read transaction termination processing implemented by control logic in the snoop response conversion unit of FIG. 5, in accordance with an aspect of the present invention.

FIG. 7 is a flowchart of one embodiment of override logic 540 for the snoop response conversion unit 200 embodiment of FIG. 5. This logic again is a continuous monitoring loop wherein logic waits for a transaction event of a type that is a processor snoop response 700. Once received, the logic determines whether the number of outstanding read transactions with modified intervention exceeds the number of dedicated read buffers with modified intervention at the bus bridge 710. If "yes", then the processor's snoop response is overridden with a retry signal 720 that is output on bus type B to the transaction dispatcher. As long as the number of outstanding read transactions with modified intervention is less than or equal to the number of dedicated buffers for that type event at the bus bridge 710, then the logic simply waits for a next transaction event 700.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising:
    monitoring at a bus interface a number of requests of a particular type for access to a resource, each request of the particular type requiring one data buffer of a number of data buffers for the particular request type at the bus interface, wherein the request of the particular type comprises a read transaction with a snoop response of modified intervention, the modified intervention indicating that a processor coupled to the bus interface has a line of memory modified in its cache that the processor wishes to provide to a requesting master initiating the read transaction, each snoop response with modified intervention requiring one modified intervention data buffer of multiple modified intervention data buffers at the bus interface for buffering modified intervention read data; and
    responsive to a received request of the particular type, initiating an override signal at the bus interface to terminate a received snoop response of modified intervention when a monitored number of read transactions with snoop responses of modified intervention exceeds the number of modified intervention data buffers at the bus interface.

2. The method of claim 1, further comprising employing a counter to monitor the number of requests of the particular type at the bus interface, and incrementing the counter with receipt of each request of the particular type at the bus interface, and decrementing the counter upon completion of forwarding of data from the bus interface associated with a request of the particular type or upon receiving at the bus interface a request termination signal corresponding to a previously received, currently pending request of the particular type.

3. The method of claim 2, wherein the initiating comprises referencing the counter to determine whether a data buffer is available at the bus interface to service the received request of the particular type, and if not, initiating the override signal, and wherein the override signal is a request retry signal.

4. The method of claim 1, wherein the initiating of the override signal occurs during a snoop phase of the received request, and the received request of the particular type is terminated before reaching a data phase.

5. The method of claim 4, wherein the override signal comprises a retry snoop response signal output from the bus interface.

6. The method of claim 5, wherein the bus interface comprises a bus bridge coupled between a first bus and a second bus, the first bus and the second bus comprising different bus types.

7. A system comprising:
    means for monitoring at a bus interface a number of requests of a particular type for access to a resource, each request of the particular type requiring one data buffer of a number of data buffers for the particular request type at the bus interface, wherein the request of the particular type comprises a read transaction with a snoop response of modified intervention, the modified intervention indicating that a processor coupled to the bus interface has a line of memory modified in its cache that the processor wishes to provide to a requesting master initiating the read transaction, each snoop response with modified intervention requiring one modified intervention data buffer of multiple modified intervention data buffers at the bus interface for buffering modified intervention read data; and
    means for initiating an override signal at the bus interface to terminate a received snoop response of modified intervention of the particular type when a monitored number of read transactions with snoop responses of modified intervention exceeds the number of modified intervention data buffers at the bus interface.

8. The system of claim 7, further comprising means for employing a counter to monitor the number of requests of the particular type at the bus interface, and for incrementing the counter with receipt of each request of the particular type at the bus interface, and for decrementing the counter upon completion of forwarding of data from the bus interface associated with a request of the particular type or upon receiving at the bus interface a request termination signal corresponding to a previously received, currently pending request of the particular type.

9. The system of claim 8, wherein the means for initiating comprises means for referencing the counter to determine whether a data buffer is available at the bus interface to service the received request of the particular type, and if not, for initiating the override signal, and wherein the override signal is a request retry signal.

10. The system of claim 7, wherein the means for initiating the override signal occurs during a snoop phase of the received request, and the received request of the particular type is terminated before reaching a data phase.

11. The system of claim 10, wherein the override signal is a retry snoop response signal output from the bus interface.

12. The system of claim 11, wherein the bus interface comprises a bus bridge coupled between a first bus and a second bus, the first bus and the second bus comprising different bus types.

13. A system comprising:
a bus bridge for coupling between a first bus and a second bus, the bus bridge including:
   a number of data buffers for a particular request type, each request of a particular type requiring one data buffer of the number of data buffers for the particular request type at the bus interface, wherein the request of the particular type comprises a read transaction with a snoop response of modified intervention, the modified intervention indicating that a processor coupled to the bus bridge has a line of memory modified in its cache that the processor wishes to provide to a requesting master initiating the read transaction, each snoop response with modified intervention requiring one modified intervention data buffer of multiple modified intervention data buffers at the bus interface for buffering modified intervention read data;
   a counter for monitoring a number of requests of the particular type received at the bus bridge from the first bus for access to the second bus; and
   override logic to determine when the monitored number of requests of the particular type exceeds the number of modified intervention data buffers for the particular request type at the bus bridge, and to initiate an override signal at the bus bridge to terminate a received snoop response of modified intervention responsive thereto.

14. The system of claim 13, wherein the bus bridge further includes update logic to increment the counter with receipt of a request of the particular type at the bus bridge, and to decrement the counter upon completion of forwarding of data from the bus bridge associated with a request of the particular type or upon receiving at the bus bridge a request termination signal corresponding to a previously received, currently pending request of the particular type.

15. The system of claim 14, wherein the override logic references the counter to determine whether a data buffer is available at the bus bridge to service the received request of the particular type, and if not, the override logic initiates the override signal, and wherein the override signal is a request retry signal.

16. The system of claim 13, wherein the override logic initiates the override signal during a snoop phase of the received request of the particular type, and the received request of the particular type is terminated before reaching a data phase.

17. The system of claim 16, wherein the override signal is a retry snoop response signal output on the second bus from the bus bridge to the processor initiating the modified intervention.

* * * * *